United States Patent [19]

Workman

[11] 4,143,006

[45] Mar. 6, 1979

[54] SIZE COMPOSITION FOR TREATING GLASS FIBERS FOR REINFORCEMENT OF PAPER COMPRISING STARCH, A POLYOLEFIN EMULSION AND LUBRICANT

[75] Inventor: Gerald B. Workman, Granville, Ohio

[73] Assignee: Owens-Corning Fiberglas Corporation, Toledo, Ohio

[21] Appl. No.: 758,254

[22] Filed: Jan. 10, 1977

[51] Int. Cl.² ............................................... C08L 3/02
[52] U.S. Cl. ............................... 260/17.4 ST; 428/378
[58] Field of Search ................. 260/17.4 ST; 428/378

[56] References Cited

U.S. PATENT DOCUMENTS

| | | | |
|---|---|---|---|
| 2,723,215 | 11/1955 | Biefeld et al. | 428/378 |
| 3,655,353 | 4/1972 | Nalley et al. | 260/29.6 X A |
| 3,891,580 | 6/1975 | Morris et al. | 260/17.4 ST |
| 3,928,666 | 12/1975 | Morrison et al. | 428/378 |
| 3,946,132 | 3/1976 | Hedden | 428/378 |
| 3,951,890 | 4/1976 | Reilly et al. | 260/17.4 ST |
| 4,009,317 | 2/1977 | Chase et al. | 260/17.4 ST |
| 4,039,716 | 8/1977 | Johnson | 428/378 |

OTHER PUBLICATIONS

Encyclopedia of Chem. Tech., —Kirk–Othmer, 2nd Ed., vol. 7, pp. 686–687, 1963.
Chem. Absts., vol. 69:61302w, Protective Coating Material for Glass Fibers, Rammel et al.
Chem. Absts., vol 72:35294n, Glass Fiber Coating, Morrison.

*Primary Examiner*—Edward M. Woodberry
*Attorney, Agent, or Firm*—Ronald C. Hudgens; Philip R. Cloutier; James B. Wilkens

[57] ABSTRACT

A size composition for use in the treatment of glass fibers as reinforcement for paper wherein the size composition is formulated of starch, a polyolefin emulsion and a lubricant and/or emulsifier. The composition can also be formulated to include a wax. Glass fibers treated with the size composition of the invention have a reduced "fuzz" content as well as improved processing characteristics.

12 Claims, No Drawings

SIZE COMPOSITION FOR TREATING GLASS FIBERS FOR REINFORCEMENT OF PAPER COMPRISING STARCH, A POLYOLEFIN EMULSION AND LUBRICANT

This invention relates to a size composition, and more particularly to a size composition for use in coating glass fibers and glass fibers coated therewith for use as reinforcement of paper.

It is now well known to reinforce paper products with glass fibers to produce packaging materials, adhesive tapes and like products in which the glass fibers are integrated with the paper. The glass fibers, by reason of their high strength, flexibility, relative inertness and the like, serve to drastically increase the strength of the paper-reinforced product.

It has been the practice, in the manufacture of fiber-reinforced paper products, to first coat the glass fibers with a size composition to impart to the individual glass fiber filaments the desired degree of lubricity without destroying their fibrous characteristics. The thin film or size coating applied to the individual glass fiber surface serves to protect the glass fibers from destruction through mutual abrasion, as the glass fibers are subjected to subsequent processing, as in the formation of woven or nonwoven fabrics or in their combination with paper materials to produce the glass fiber-reinforced paper product. The size composition also serves to promote compatibility between the glass fiber surfaces, which are smooth, rod-shaped members to which it is difficult to form any physical bond, with the paper material forming the paper product.

One of the difficulties which has been encountered in the reinforcement of paper with glass fibers is the tendency of the glass fibers to "fuzz", that is, the tendency of the individual glass fiber filaments to become disassociated with a strand, yarn or fabric (referred to in the art as bundles) and form a mass of intermeshed fibers protruding from the paper product. In addition, there has been a tendency, in the processing of sized glass fibers, to combine them with paper products for the size compositions to become disassociated with the glass fiber surfaces, thereby creating dust problems during processing.

It is accordingly an object of the present invention to provide a size composition and glass fibers treated therewith which overcomes the foregoing disadvantages.

It is a more specific object of the present invention to provide a size composition and glass fibers treated therewith for use in the reinforcement of paper wherein the sized glass fibers have a significantly reduced tendency to form "fuzz" and powders during processing.

It is a further object of the present invention to provide sized glass fibers in which the glass fibers can be efficiently coated as they are formed to produce strands, yarns or cords having good tensile strength, tenacity and adherance to paper products reinforced with the glass fibers.

The concepts of the present invention reside in a size composition formulated to include a starch in combination with a polyethylene emulsion along with lubricants and emulsifiers to promote the compatibility of the system. The combination of the polyethylene emulsion and the starch serves to form a tough adherent film on the individual glass fiber surfaces subsequently combined with the paper; the starch and polyethylene combination, it is believed, serves to promote the compatibility between the treated glass fibers and the paper materials with which the glass fibers are combined in the manufacture of glass fiber-reinforced paper products. It has been found that glass fibers treated with the size composition of this invention have improved tensile strengths as well as the desired degree of lubricity, while at the same time having a reduced "fuzz".

In a preferred form of the invention, the size composition is formulated to include starch and a polyethylene emulsion in combination with a wax emulsion. It has been found that the inclusion of the wax in the size composition further improves the properties of the treated glass fibers, including the ability of the size composition to adhere to the glass fiber surfaces as well as a reduced "fuzz" count.

As the polyethylene emulsion, use can be made of a number of emulsions of polyethylene commercially available. One such emulsion preferred for use in the practice of this invention is Velvetol 77-27, a cationic emulsion of polyethylene marketed by the Quaker Chemical Co. However, other polyethylene emulsions equally well known to those skilled in the art may also be used. In addition, use can be made, if desired, of higher polyolefins, such as polypropylene or copolymers of ethylene and propylene in aqueous emulsion.

As the starch component, use can be made of a variety of starches, including waxy and non-waxy starches, as well as derivatives thereof. Included in such derivatives are partially hydrolyzed starches as well as derivatized starches. As used herein, the term "derivatized" starches refers to and includes starch derivatives in which one or more of the primary or secondary alcohol groups contained in the starch have been replaced by other groups such as acetate groups, phosphate groups, hydroxy alkyl groups (starch ethers) and cationic groups, such as cationic starches. As is well known to those skilled in the art, such starch derivatives are commercially available and are described in detail in the *Encyclopedia of Chemical Technology*, by Kirk and Othner, Vol. 18, pp. 685–689 (1969, John Wiley And Sons Inc.). Preferred starches for use in the present invention include Hylon V, a high amylose corn starch from National Starch, Superlose 2116 from Stein-Hall, derivatized potato starch, as well as others well known to those skilled in the art.

When the size composition of this invention is formulated to include a wax, use is preferably made of waxes having a relatively high degree of crystallinity, and preferably paraffin waxes. Such waxes, including Boler Wax from Boler Chemical and Shellwax from Shell Chemical Company, are microcrystalline paraffin waxes finely dispersed in aqueous medium.

In addition to the polyolefin and starch, the size composition of this invention is also formulated to include emulsifiers, lubricants and wetting agents, all of which are known to those skilled in the art. Preferred are the non-ionic lubricants, emulsifiers and wetting agents. Illustrative of such materials are lubricants formed by reaction of a long-chain fatty acid with a polyalkylene polyamine (e.g., the reaction product of stearic acid with triethylenetetramine, tetraethylenepentamine, pentaethylenehexamine, etc.), sorbitan-based emulsifiers, such as sorbitan monostearate or polyoxyethylene derivatives thereof (such as polyoxyethylene sorbitan monostearate) and lubricants in the form of esters of saturated long-chain fatty acids or fatty alcohols such as stearic acid esters, stearyl alcohol esters and like fatty acids and alcohols containing 8 to 20 carbon atoms, and non-ionic emulsifiers from the class of alkylphenoxypoly(oxyethylene) ethanols produced by reaction of alkyl phenol with ethylene oxide. These latter materials are commercially available from GAF under the trademark Igepal.

The relative proportions of the components of the size composition of the invention can be varied within relatively wide ranges. In general, the size composition of the invention is formulated to contain from 1 to about 10% by weight of the starch and from about 1 to about 10% by weight of the polyethylene emulsion. The wax, when present, usually ranges from about 0.1 to about 3% by weight. The amount of emulsifiers and/or lubricants employed is likewise not critical and can be varied within relatively wide ranges. In general, the total of the lubricants and/or emulsifiers ranging from 0.1 to about 5% by weight, or percentages being based on the total weight of the composition.

In the practice of the invention, the glass fibers are coated with the size composition to form a thin film coating on the individual glass fiber filaments in accordance with conventional techniques. It is generally preferred that the glass fibers be coated with the size as they are formed. For example, the individual glass fiber filaments can be passed in contact with a rubber apron wet with the size composition as the individual glass fiber filaments are attenuated from the glass melting furnace to form a strand. Usually, the glass fibers are coated with sufficient quantities of the size composition such that the loss on ignition ranges from 0.1 to about 3% by weight, and preferably 0.5 to 1.5% by weight.

After the glass fibers are sized, they can be combined with paper products in the manufacture of glass fiber reinforced paper products in accordance with conventional techniques. In the final glass fiber reinforced paper product, the paper product constitutes the bulk of the product, with the glass fiber reinforcement being distributed through the paper to impart strength thereto.

Having described the basic concepts of the invention, reference is now made to the following examples, provided by way of illustration, and not by way of limitation, of the practice of this invention.

EXAMPLE 1

| A size formulation is made as follows: | |
|---|---|
| High amylose corn starch (Hylon V) | 2.50% |
| Derivatized potato starch (Superlose 2116) | 1.00% |
| Lubricant in the form of saturated long-chain fatty acids and alcohols (Spermafol 5200 - Ashland Chemical) | 1.25% |
| Emulsifier (Sorbitan monostearate) | 0.10% |
| Emulsifier (Polyoxyethylene monostearate) | 0.08% |
| Lubricant (Reaction product of stearic acid with tetraethylenepentamine) | 0.25% |
| Cationic polyethylene emulsion (Velvetol 77-27) | 3.00% |

The foregoing size composition is used to size glass fibers as they are formed. The resulting glass fibers are then combined with paper products as reinforcement, providing good results. The glass fibers are found to have a low "fuzz" count and high tensile strength.

EXAMPLE 2

Another size embodying the features of this invention is formulated as follows:

| | |
|---|---|
| High amylose corn starch (Hylon V) | 3.00% |
| Paraffin wax (Boler Wax) | 1.00% |
| Lubricant (Fatty acid esters for fatty alcohols - Spermafol 5200) | 0.50% |
| Emulsifier (Polyoxyethylene sorbitan monostearate) | 0.12% |
| Lubricant (Reaction product of stearic acid with tetraethylenepentamine) | 0.20% |
| Cationic polyethylene emulsion (Velvetol 77-27) | 2.50% |

EXAMPLE 3

A further size composition according to the invention is formulated as follows:

| | |
|---|---|
| High amylose corn starch (Hylon V) | 3.00% |
| Paraffin wax (Shellwax) | 1.00% |
| Lubricant (Fatty acid esters for fatty alcohols - Spermafol 5200) | 0.50% |
| Emulsifier (Polyoxyethylene sorbitan monostearate) | 0.14% |
| Emulsifier (Sorbitan monostearate) | 0.12% |
| Lubricant (Reaction product of stearic acid with tetraethylenepentamine) | 0.25% |
| Cationic polyethylene emulsion (Velvetol 77-27) | 2.50% |

The above composition is applied to glass fibers as they are formed using a rubber apron, in accordance with known techniques. The L.O.I. of the sized glass fibers was about 1.0%.

The resulting yarn formed of sized fibers has a "fuzz" index of 1.02 and a tensile strength of 8.43 lbs.

It will be understood that various changes and modifications can be made in the details, formulation and use without departing from the spirit of the invention, especially as defined in the following claims.

I claim:

1. An aqueous size composition for use in the treatment of glass fibers for reinforcement of paper comprising:
   (a) a starch,
   (b) a polyolefin emulsion, and
   (c) a lubricant.

2. A composition as defined in claim 1 wherein the polyolefin is selected from the group consisting of polyethylene, polypropylene and copolymers of ethylene and propylene.

3. A composition as defined in claim 1 wherein the starch is selected from the group consisting of high amylose corn starch and derivatized potato starch.

4. A composition as defined in claim 1 wherein the lubricant is selected from the group consisting of (1) the reaction product of a polyalkylene polyamine with a long-chain fatty acid, (2) esters of fatty acids, (3) esters of fatty alcohols and (4) mixtures thereof, said acids and said alcohols containing between 8 and 20 carbon atoms.

5. A composition as defined in claim 1 which further contains at least one emulsifier.

6. A composition as defined in claim 5 wherein the emulsifier is selected from the group consisting of sorbitan-based emulsifiers and alkylphenoxypoly(oxyethylene) ethanols.

7. A composition as defined in claim 4 which further includes a paraffin wax.

8. A composition as defined in claim 1 wherein the composition includes, based on total weight of composition, 1 to 10% by weight of the starch and 1 to 10% by weight of the polyolefin.

9. A composition as defined in claim 8 wherein the lubricant ranges from about 0.1% to 5% by weight.

10. A composition as defined in claim 7 wherein the paraffin wax ranges from about 0.1 to 3% of the total weight of composition.

11. A size composition as defined in claim 7 containing, based on total weight of said composition, 1% to 10% by weight of said starch, 1% to 10% by weight of said polyolefin emulsion, 0.1% to 3% by weight of said wax and 0.1% to 5% by weight of said lubricant.

12. The size composition of claim 11 further comprising 0.1 to 5% by weight of an emulsifier.

* * * * *